April 11, 1961  H. L. SEEGER  2,978,949
PHOTOGRAPHIC FLASH METER
Filed Aug. 9, 1956  2 Sheets-Sheet 1

INVENTOR.
Homer L. Seeger
BY Frank H. Marlos
Nathan N. Kraus
Attorneys

April 11, 1961
H. L. SEEGER
2,978,949
PHOTOGRAPHIC FLASH METER
Filed Aug. 9, 1956
2 Sheets-Sheet 2
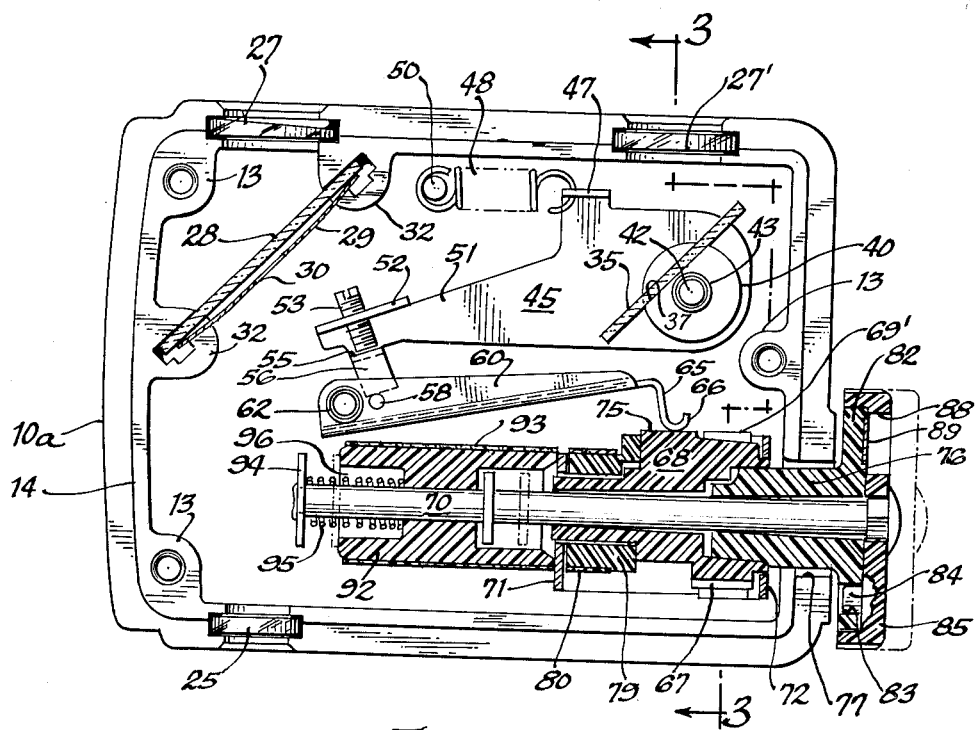
FIG. 2
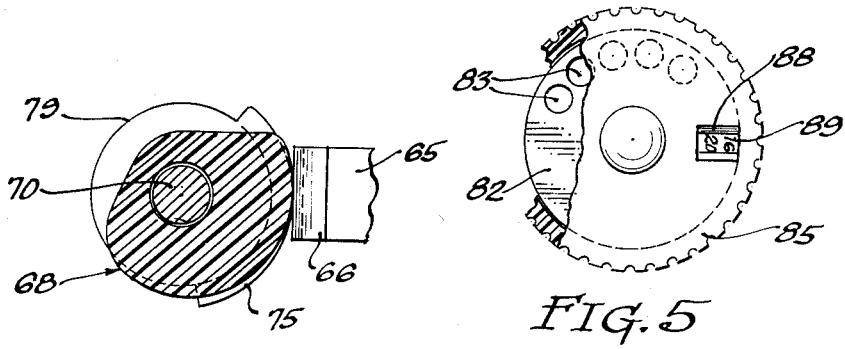
FIG. 4
FIG. 5
INVENTOR.
Homer L. Seeger
BY Frank H. Marks
Nathan N. Kraus
Attorneys United States Patent Office 2,978,949
Patented Apr. 11, 1961

2,978,949
PHOTOGRAPHIC FLASH METER
Homer L. Seeger, Oak Park, Ill., assignor to Sears, Roebuck and Co., Chicago, Ill., a corporation of New York Filed Aug. 9, 1956, Ser. No. 603,082
2 Claims. (Cl. 88—2.4)

My invention relates to exposure meters for use in taking flashlight exposures with camera-synchronized flash guns.

My invention contemplates a meter which may be produced in pocket-size for convenient portability and use by the amateur photographer and which will provide all the necessary data for the successful taking of flash exposures, and which may also be used as a range finder.

More particularly, improved meters embodying my invention comprise a range finder in combination with data carrying means whereby the operator may correlate film speed, flash bulb characteristics, shutter speed, lens aperture and distance between the camera and the object being photographed, and may be used to ascertain range as well as the lens aperture appropriate to various other given conditions.

My invention is based on the principle that, in taking flashlight photographs, the lens aperture will vary with the distance of the object from the camera-gun assembly according to an established formula, depending on film speed and flash bulb characteristics as variables.

My invention will be best understood by reference to the appended drawings forming a part of this specification and illustrating a preferred embodiment of my invention, wherein:

Fig. 2 is a top plan view of the meter with the cover removed.

Fig. 4 is a side elevational view of a cam and associated part (the latter shown fragmentarily) embodied in my invention, and Fig. 5 is a side elevational view of an actuating knob and associated parts embodied in my invention, a portion being cut away for clearness.

Figure 1:
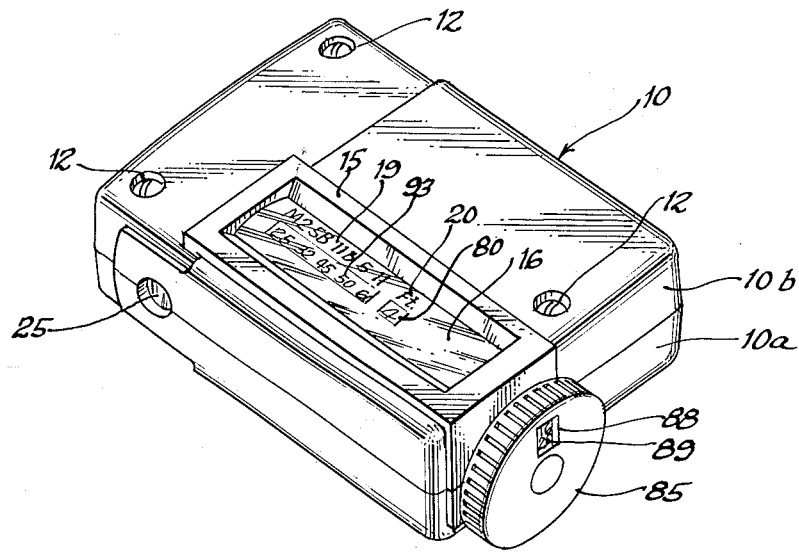
Fig. 1 is a top perspective view of a meter embodying my invention.

My invention contemplates a meter housing indicated generally by the numeral 10, comprising lower and upper casing members 10a and 10b. These casing members may be formed of molded plastic or other suitable material, preferably in rectangular form and secured together by screws 12 which extend through bosses in the upper casing member 10b and are threadedly engaged in bosses 13 formed in lower casing member 10a. The lower casing member 10a is preferably provided with an upstanding positioning shoulder 14 extending parallel to the side walls of the casing.

Figure 3:
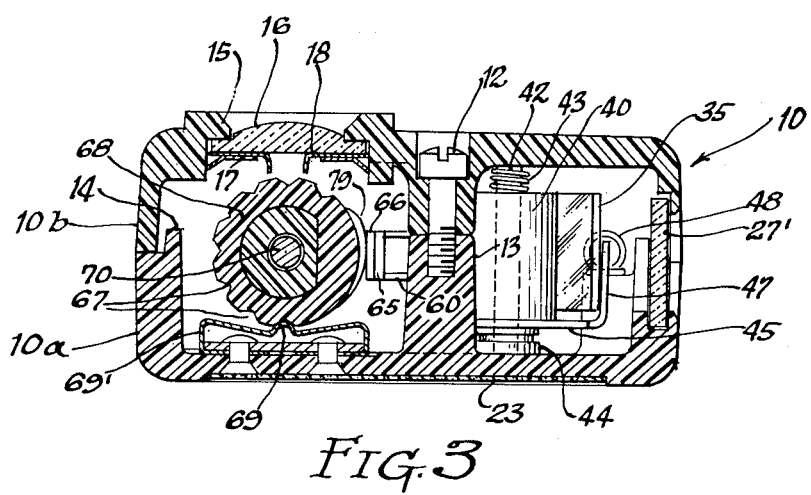
Fig. 3 is a sectional view taken substantially along the line 3—3 of Fig. 2.

The upper casing member 10b is provided with a beveled window 15 closed by an enlarging lens 16 of transparent plastic, glass or the like, said lens being retained in position by means of a suitable spring plate 17 (Fig. 3). Disposed between the plate 17 and lens 16 is a sheet 18 bearing on its upper surface, so as to be legible through the lens 16, indicia as seen in Fig. 1, or such indicia may be printed on the upper surface of plate 17. Thus, at 19 may be a row of indicia representing in any commonly known code the flash bulbs on the market having various characteristics. At 20 may be indicated any suitable unit of distance, such as feet.

Fixedly secured to the outer face of the bottom shell 10a, as being molded therein, is a data plate or sheet 23, formed of metal or other suitable material. This plate may display data which is convenient or essential in the taking of flashlight photographs, such as code numbers for the various types of flash bulbs available on the market and likewise code or index indicia for the various types of film emulsions available on the market, all of which information will be keyed to similar data provided on working parts of the meter, as hereinafter described.

Housed within the casing 10 is a range finder of the standard "superimposed image" type, comprising a viewing lens 25 seated in an opening in one side wall and a pair of object lenses 27 and 27' spaced apart on the opposite side wall of the casing, the object lens 27 being positioned directly opposite viewing lens 25.

Secured to casing member 10a between lenses 25 and 27 is a semi-transparent mirror 28 adjacent and parallel to which is a plate 29 having a central aperture 30. The mirror 28 and plate 29 comprise a unit which is arranged obliquely with reference to object lens 27 and secured within slotted bosses 32, 32 which are molded integrally with casing member 10a. The aperture 30 is so positioned that an image may be conveyed directly from lens 27 to lens 25.

In the opposite corner of the casing is arranged a mirror 35 disposed generally parallel to mirror 28 and directly opposite object lens 27'.

As will be readily understood by those skilled in the art, the various lenses and mirrors are so adjusted that the image of the object will be transmitted directly by lens 27 through the semi-transparent mirror 28 to viewing lens 25 while a similar image will be focused by object lens 27' on mirror 35 and reflected by the latter to mirror 28 and thence reflected to viewing lens 25.

Adjustment of the angular position of mirror 35 for objects at various distances, whereby the two images may be made to coincide in viewing lens 25, to ascertain the range, is accomplished in the following manner.

Mirror 35 is secured as by adhesive to a flat face 37 of cylindrical post 40 slidably carried on spindle 42 and retained by a coil spring 43. The post 42 is retained in a bearing member 44 molded into the bottom wall of casing member 10a and serves as a pivot for a rockable plate 45. This plate has an integral upstanding ear 47 apertured to receive one end of a coil spring 48, the other end of which is attached to a retaining post 50 which is also molded integrally with the bottom wall of casing member 10a.

Plate 45 has a laterally extending lever arm 51 adjacent the free end of which is an upstanding ear 52 apertured to receive an adjusting screw 53 which bears against a resilient L-shaped ear 55 which extends upwardly integrally with plate 45 and has a laterally extending finger 56 which abuts against a post 58 carried by a multiplier lever 60. This lever 60 like plate 45 may preferably be stamped from sheet metal or of other suitable material and may conveniently be generally U-shaped in cross-section, being pivotally secured to housing member 10a as by means of pintle 62 mounted in a suitable bearing member molded integrally in the casing. Integral with lever 60 is a tongue portion 65 extending laterally generally at right angles from the major axis of multiplier lever 60 and having an arcuate terminal finger 66 which slidably bears against a cam sleeve indicated generally by the numeral 68.

The sleeve 68 is slidably and rotatably geared on the shaft 70 which is secured to the bottom wall of the casing as by means of brackets 71 and 72. As will be seen in Fig. 4, the sleeve 68 is provided with a cam surface 75 which reacts against the cam follower 65—66 so that when the sleeve is rotated clockwise as seen in Figs. 3 and 4, the cam follower will be moved away from the shaft 70, thus rocking the multiplier lever 60 about its axis 62 and in turn rocking the plate 45 and with it mirror 35 about the post 42 as a pivot.

Axially spaced from the cam surface 75 on sleeve 68 are provided a plurality of detents 67 (Fig. 3) which engage an abutment 69 formed on a spring plate 69' secured to the bottom of the casing portion 10a as by rivets.

Splined to the sleeve 68 is a sleeve 76 which is rotatably disposed in an opening 77 in casing 10. Also keyed to sleeve 68 is a sleeve 79 to the outer face of which is secured, as by adhesive, a strip 80 bearing indicia indicative of distance measured in any suitable units, as in feet or meters, according to a calibration of the device, representing distance of the object from the position of the operator. Said indicia will be printed around the periphery of strip 80, so that one figure will be uppermost at any given position as the sleeve 79 is rotated.

Integral with the sleeve 76 is a notched disk 82 having a plurality of apertures 83 therein in which may be seated a dog 84 formed on the rear of a knurled manipulating knob 85. This knob is provided with a slot or window 88 through which may be read indicia as indicated at 89 printed on the outer face of disk 82, which indicia may represent emulsion speeds of various films available on the market, based upon any suitable code or system whereby the speed of a given film may be indicated.

Keyed to the shaft 70 so as to be rotatable therewith at all times is a sleeve 92 carrying on the outer face thereof a sheet 93 bearing parallel rows of indicia indicative of lens apertures or diaphragm openings, commonly referred to as *f* numbers, these rows being alined with the distance indica printed on sheet 80 and parallel to the axis of shaft 70 and also arranged under the various flashbulb index numbers 19. A disk 94 is fixed to the end of shaft 70 and serves to retain a coil spring 95 disposed on the shaft, sleeve 92 having a hollow portion 96 at the end thereof housing the spring 95.

In the use of my improved meter, the operator, having been instructed to adjust his shutter value to a definite speed, say 1/25 or 1/30 second, will first grasp the knob 85 and move it out axially against the resistance of spring 95, thus disengaging dog 84 from an aperture 83, and rotate said knob until the window 88 exposes indicia 89 which is appropriate to the particular film emulsion which he is using, and the knob is then released, again engaging dog 84 with one of the apertures 83. It will be seen that, as the knob 85 is rotated, sleeve 92 and indicia sheet 93 bearing diaphragm indicia will likewise be rotated, said sleeve 92 being keyed to shaft 70. At the same time sleeve 79 with distance indicia sheet 80 will remain immovable inasmuch as outward axial movement of knob 85 disengages it from sleeve 76 which in turn is keyed to sleeve 68 and the latter in turn is keyed to sleeve 79.

After setting of the film emulsion index, the operator will proceed to adjust the range finder in the usual manner, sighting through viewing lens 25 and turning the knob 85 until the double images visible through lens 25 coincide, as is well understood in the art.

It will be seen that, by rotation of knob 85 in adjusting the range finder, sleeve 92 with its aperture indicia sheet 93 is rotated along with the distance indicia sheet 80 carried on sleeve 79. Hence, after the double images have been caused to coincide, the operator may read through lens 16 the distance of the object in feet or some other unit as indicated on indicia sheet 80, and may also read under the appropriate code number in the stationary series 19 the appropriate diaphragm opening or *f* number from indica sheet 93.

It will be apparent from the above that, by means of meters embodying my invention, an unskilled person may achieve flash light exposures of optimum quality by merely two simple adjustments, namely, adjustment of the knob 85 to the appropriate emulsion speed and of the range finder to ascertain the correct diaphragm opening appropriate to the characteristics of the particular type of flash bulb which he is employing.

It will be apparent, of course, that the meter must be accurately calibrated and adjusted, first as to the range finder parts and the distance indicia on strip 80 keyed to the range finder; also, as to the aperture indicia on strip 93, which must be arranged according to known formula to increase the lens opening with the distance, and also in accordance with the known physical characteristics of various bulbs.

Various changes coming within the spirit of my invention may suggest themselves to those skilled in the art. Hence, I do not wish to be limited to the specific embodiment shown and described or uses mentioned, but intend the same to be merely exemplary, the scope of my invention being limited only by the appended claims.

I claim:

1. A computing device of the class described, comprising a box-like case, a range finder disposed within said case including an angularly adjustable mirror, means coupled to said range finder for determining, for various film speeds and flash bulb characteristics, appropriate diaphragm openings for optimum flashlight exposures at various distances and at constant shutter speed, said coupled means comprising a shaft arranged in said case for rotation and axial translation, said shaft extending through a wall of said case and having a manipulating member fixed thereon outside said case, said shaft being spring-loaded, whereby it is normally retained in one position and is longitudinally translatable against the action of said spring to another position, cam means carried by said shaft for transmitting motion from said shaft to said adjustable mirror to find the distance to an object, means normally connecting said shaft to said cam means and disconnectable therefrom when the shaft is translated against the action of said spring, a drum keyed to said shaft and bearing circumferentially therearound a plurality of linear series of diaphragm-opening indicia, each line of indicia representing a series of diaphragm openings corresponding to a particular film emulsion speed, and each circumferential row of indicia representing a series of openings corresponding to a certain type of flash bulb, a second series of indicia disposed linearly on the case and aligned with said first series, said second series representing various flash bulbs of different characteristics, means carried by said shaft outside said case and disengageable from the shaft when the latter is translated against the action of said spring and carrying a third series of indicia annularly arranged and representing emulsion speeds, and datum indication on said manipulating member cooperating with the third indicia series whereby, when the shaft and drum have been angularly coordinated with a particular emulsion speed, the finding of distance to an object will adjust the appropriate linear series of diaphragm openings in coordination with the second series of indicia.

2. A combination as in claim 1, wherein said shaft carries a second drum bearing circumferentially a series of indicia coordinated with the range finder to represent distances from said object, said indicia being normally aligned with the linear rows of indicia on said first drum and permanently keyed to said third series of indicia, the shaft being disengageable from said second drum when the shaft is translated against the action of the spring.

References Cited in the file of this patent

UNITED STATES PATENTS

| | | |
|---|---|---|
| 2,213,749 | Strauss | Sept. 3, 1940 |
| 2,815,171 | Norwood | Dec. 3, 1957 |
| 2,870,670 | Norwood | Jan. 27, 1959 |

FOREIGN PATENTS

| | | |
|---|---|---|
| 502,044 | Italy | Nov. 26, 1954 |

OTHER REFERENCES

Photography Magazine, January 1953, published by Ziff-Davis Publshing Co., Chicago, Illinois; page 1, Norwood advertisement, item Norwood Flashrite.